United States Patent

Kariniemi

[11] Patent Number: 5,545,559
[45] Date of Patent: Aug. 13, 1996

[54] COMPOST MAKER

[75] Inventor: Pekka Kariniemi, Kauttua, Finland

[73] Assignee: Favorit Oy, Finland

[21] Appl. No.: 284,620

[22] PCT Filed: Feb. 17, 1993

[86] PCT No.: PCT/FI93/00053

§ 371 Date: Aug. 11, 1994

§ 102(e) Date: Aug. 11, 1994

[87] PCT Pub. No.: WO93/16018

PCT Pub. Date: Aug. 19, 1993

[30] Foreign Application Priority Data

Feb. 18, 1992 [FI] Finland .............................. FI-U920149
Oct. 7, 1992 [FI] Finland .............................. FI-924534

[51] Int. Cl.$^6$ ................................................. C12M 1/04
[52] U.S. Cl. ..................... 435/290.1; 435/290.4; 220/484; 220/908
[58] Field of Search .................... 435/287, 313, 435/315, 299, 290.1, 290.4; 422/184; 71/8–10; 220/4.04–4.1, 4.28, 4.33, 4.84, 908

[56] References Cited

U.S. PATENT DOCUMENTS 3,314,765  4/1967  Abson et al. .
3,756,784  9/1973  Pittwood .

FOREIGN PATENT DOCUMENTS

| 1162/69 | 6/1974 | Finland . | |
|---|---|---|---|
| 2241603 | 3/1973 | Germany | A47K 11/02 |
| 3802499 | 5/1991 | Germany | C05F 9/02 |
| 2315705 | 10/1994 | Germany | C05F 9/00 |
| 632227 | 9/1982 | Switzerland | C05F 9/02 |
| 671219 | 8/1989 | Switzerland | C05F 9/02 |

Primary Examiner—David A. Redding
Attorney, Agent, or Firm—Andrus, Sceales, Starke & Sawall

[57] ABSTRACT

A compost maker comprising an upright container having on its top end a cover for introducing material to be composted in the container, having in its lower part a hatch for removing composted material from the container, and containing an air tube system for guiding air in among the material to be composted. The air tube system comprises at least two tubes on different heights, the lower tube being connected through the wall of the container with an air intake aperture, and which are interconnected with a connecting tube and their lower parts provided with holes. The cover is fitted with an exit duct, the air flowing through the holes in the tubes and upward through the material to be composted and through the exit duct out from the container. The material to be composted, supported by the transverse tubes, moves in controlled manner downwardly as the composting of the material progresses.

15 Claims, 2 Drawing Sheets

COMPOST MAKER

The present invention concerns a compost maker.

In existing art, various container-like compost maker designs are known in which the material to be composted is introduced through an openable hatch on top, this material flowing downward in the container, and comparatively finished mould being obtained from the lower part of the container. Compost maker designs of this type are disclosed e.g. in following patents: GB 1403984, DE 3802499, and U.S. Pat. No. 4,105,412.

The greatest problem in present designs is indeterminacy of their air circulation. The containers leak rather great quantities of gas through the hatch joints, and the air passages provided in them direct the air summarily in among the material to be composted, whereby its combustion is uneven and the temperature inside the compost maker varies greatly in accordance with ambient conditions. It is also a fact that the material to be composted flows downward, and is packed, unevenly at different points in the compost maker, resulting in uneven combustion.

The object of the invention is to eliminate the drawbacks just discussed. It is particularly an object of the invention, to disclose a novel compost maker which enables closely controlled and stable conditions within the compost maker so that combustion of the material to be composted takes place uniformly and under substantially constant conditions, independent of conditions external to the compost maker.

Regarding the circumstances characterizing the invention, reference is made to the claims section.

The compost maker of the invention comprises an upright container having on its top end an openable cover for introducing the material to be composted in said container. In the lower part of the container an openable hatch is provided for removing the composted material from the container, and the container further comprises a system of air tubes for directing air in among the material to be composted residing in the container.

As taught by the invention, the air tube system comprises at least two substantially horizontal tubes extending substantially from one side of the container to the other, within the container. The tubes are at different heights in the container. The lower tube has been connected through the container wall with an air intake aperture, in order to direct air into the container. The substantially horizontal tubes are interconnected by means of a connecting tube, and the undersides of the horizontal tubes carry apertures serving as air flow holes, through which the air admitted into the tubes by a valve can flow into the material to be composted. Furthermore, the cover is fitted with an exit duct through which the air can flow out of the container.

Thus, the essential feature of the invention are at least two transverse air tubes, supporting the material, on different heights. There may, of course, be more than two tubes. For instance, in larger containers, two tubes in parallel in the same plane, and another two tubes in a second plane may be used. In high containers, tubes may also be provided in several planes.

Advantageously, the air intake aperture and/or the exit duct is provided with an adjustable valve, and the cover is fitted with packings and locking means enabling the cover to be hermetically sealed against the respective rims on the container. The air will then be made to flow with the aid of the adjustable valve in controlled and guided manner through the air flow holes of the tubes and upward through the material to be composted, and through the exit valve on the cover, out of the container. At the same time, in the course of its progressing combustion the material will run downward in guided manner, supported by the transverse tubes, toward the lower part of the container, whence it can be removed through an openable hatch. Being supported by the tubes, the matter that is being composted will not be packed to a compact clump: it stays fluffy and runs with progressing combustion downward, thus enabling thorough combustion to take place and an end product of good quality to be obtained.

Advantageously, the openable cover upon the container as well as the openable hatch in the lower part of the container are both provided with conical rim surfaces and the container presents corresponding, conical mating faces, in which case suitable packings are used between the faces, such as rubber gaskets. Moreover, the cover and the hatch carry suitable locking means, clamp bolts or equivalent, whereby these can be hermetically clamped fast to the container and, thus, extra air leakage from or into the container is prevented.

Advantageously, the compost maker is made of a thermally well-insulating structure, e.g. of two plastic/glass fibre shells placed one inside the other and of interposed lagging material, e.g. polyurethane.

Advantageously, the transverse tubes are curved, with their ends lower than the centre, i.e., upward convex, whereby in operation, when the tubes get warm and the stuff is pressing down on the tubes, they are placed under stress and push harder against the inner shell of the container and against the supports. In an embodiment of the invention the transverse tubes rest by their ends on an annular support which rests against the inner shell of the container, in which case said annular support and the transverse tubes may in combination constitute air passages through which air can flow into the material to be composted. Thus, advantageously, on the inner shell of the container bosses or equivalent projections are provided on which the annular support or the transverse tubes rest, implying that they need not be fixedly attached to the inner shell of the container.

The compost maker design of the invention affords a chance to create closely controlled and highly stable conditions for combustion, even in a cold environment, notably in instances in which the material used for the container, the cover as well as the hatch is a suitable bilaminar structure, e.g. a suitable plastic with interposed lagging.

BRIEF DESCRIPTION OF THE DRAWINGS

In the following the invention is described in detail with reference to the attached drawing, wherein.

Figure 1:
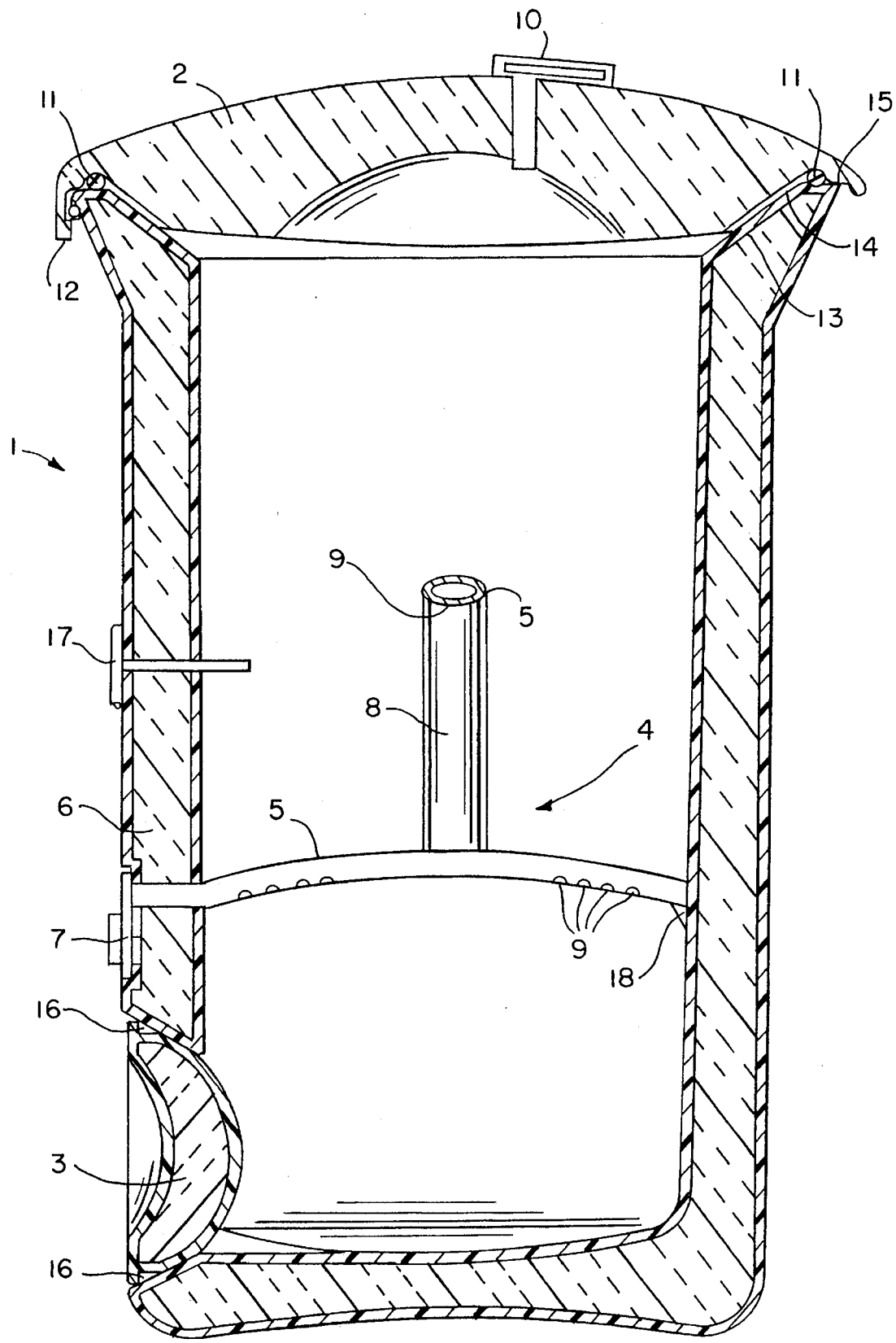
FIG. 1 is a sectional view of a compost maker according to the invention.

The compost maker of FIG. 1 consists of an upright, cylindrical container 1, of which the shell is composed of two layers e.g. of glass fibre reinforced plastic with an interposed, suitable lagging, e.g. polyurethane. The upper margins of the container 1 form an outwardly broadening, circular conical surface 13, and the cover 2 of the container carries a mating surface 14 corresponding to this conical surface, whereby the surfaces fit, and become accurately sealed, against each other. Furthermore, in the upper part of the conical surface and the mating surface a gasket 11 has been provided, which seals these surfaces hermetically against each other. The cover 2 is supported by a hinge 15 on the container, whereby when the cover 2 is turned down upon the container the conical surface and the mating surface can be locked in place with the aid of a locking clamp 12 on the side of the cover opposed to the hinge 15.

The cover 2 furthermore carries an exit valve 10, through which the gases can flow out from the container. The underside surface of the cover 2 has been arranged to have such shape when the cover is closed that it slopes inward from the rim of the container in the downward direction, whereby any moisture condensing on the cover will not run down the sides of the container, but will instead drop down uniformly upon the material to be composted.

In the lower part of the container, in the vicinity of its bottom, a draining hatch 3 has been provided, which likewise, in resemblance of the shaping of the cover 2, has conically inward narrowing margins and, on the container, corresponding mating surfaces, between which a gasket 16 is interposed. Hereby, a suitable locking means, which has not been depicted, can be used to secure the hatch 3 tightly in place so that no air leakage is admitted therethrough into the container when the hatch is closed.

The air tube system 4 inside the container 1 comprises of two substantially horizontal tubes 5 having oval cross section, which are located at a vertical distance of each other, with 90° offset relative to each other. The tubes are upward curved in the centre and they are interconnected with a vertical connecting tube 8, located substantially in the centre of the container. Both tubes 5 extend inside the container 1 from wall to wall 6 thereof, and they rest on projections 18 on said walls. The lower parts of both tubes 5 are provided with a plurality of air flow holes 9.

Of the tubes 5, the lower one extends at one end through the wall 6 to an adjustable valve 7, and by regulating this valve it becomes possible to control the air flow through the tubes 5 into the container. The container further comprises a thermometer 17, on which the temperature in the container can be read, in accordance with which the valve 7 can be adjusted.

The tubes 5 placed transversely in the container serve as an element supporting the compost material, with the effect that the material will not be excessively packed and compacted on the bottom of the container. Since moreover the air flow holes on the tubes have been disposed on their undersides, the holes cannot get plugged, and uniformly functioning air circulation is achieved in the entire material to be composted. The oval cross section configuration of the tubes and their placement with their broad dimension horizontal have been chosen for the reason that this enables the supporting surface and supporting action of the tube to be made comparatively large, and the air flow holes find a good, well-protected accommodation on their underside, which would be clearly less if the tube were round. Moreover, the curved shape of the tubes ensures their holding on support of the projections 18 because at comparatively high temperature, when the stuff is weighing on the tubes, the tubes bend downward and, owing to their curvature, are urged even harder against the sides of the container.

Figure 2:
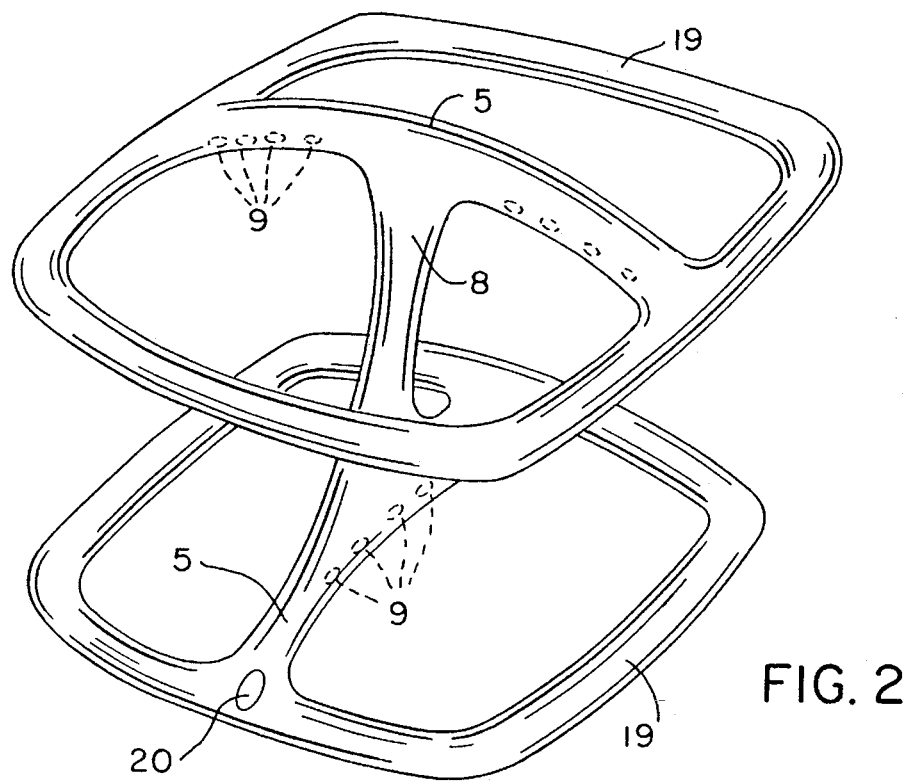
FIG. 2 presents an air tube embodiment of the invention.
Figure 3:
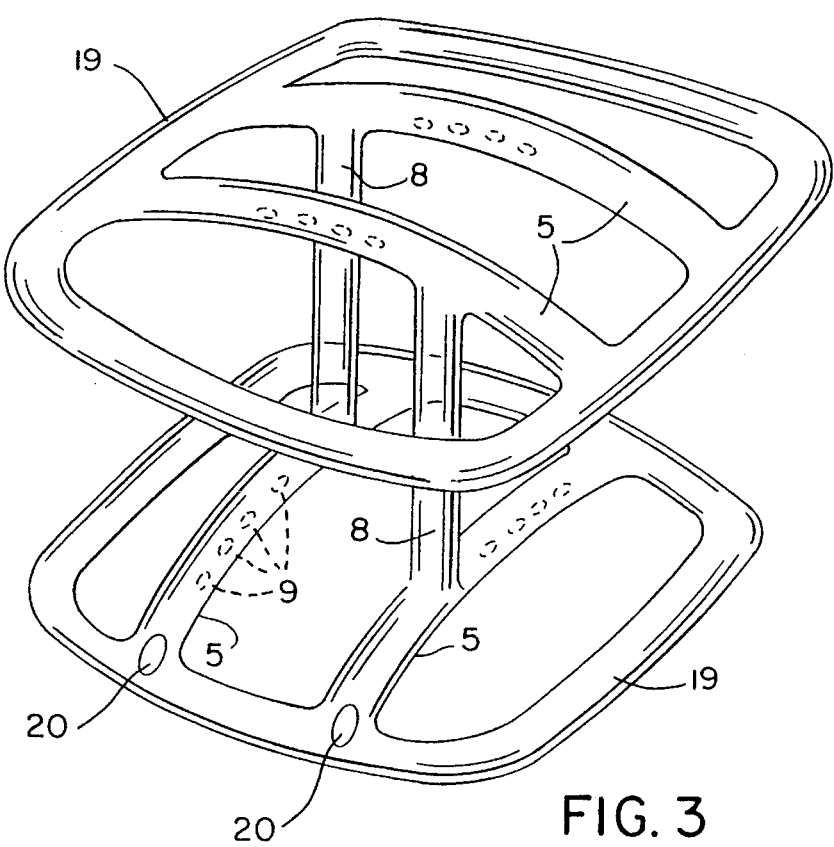
FIG. 3 shows 2 pairs of parallel air tubes in different planes.

In FIG. 2 is presented an air tube arrangement according to the present invention, in which the transverse tubes 5 of curved shape are braced against each other by a vertical connecting tube 8, and on the ends of the tubes belong annular supports 19, which may equally consist of hollow tubular section material. The support is a substantially horizontal ring running around the inner shell of the container and to which the transverse tube is connected by its ends. Hereby, the supports 19 as well as the tubes 5 will in combination form the air ducts of the compost maker and the structure supporting the stuff being composted, and this entity can be supported as a loose component on the projections 18 on the inner shell, by connecting the air intake hole 20 with the air duct passing through the shell. It is thus understood that the supports 19 may also comprise air holes.

In the foregoing the invention has been described by way of example with the aid of an advantageous embodiment thereof, while different structural solutions of the invention are feasible in the scope of the inventive idea delimited by the claims.

I claim:

1. A compost maker comprising:

an upright container (1) having on its top end an openable cover (2) for introducing material to be composted in the container, said container having in its lower part an openable hatch (3) for removing composted material from the container;

an air tube system (4) contained in said container for guiding air into the material to be composted in the container, said air tube system (4) comprising at least two pairs of side-by-side, transverse tubes (5) on different heights, extending substantially in horizontal direction and extending substantially from side to side of the container the tubes of each of said pairs being located substantially in the same plane, the lowermost of said pairs of tubes being connected through the wall (6) of the container with an air intake aperture (7), said pairs of tubes (5) being interconnected with a connecting tube (8), and the lower parts of said tubes being provided with air flow holes (9); and an exit duct (10) fitted in the cover (2), whereby air flows through the air flow holes (9) of the tubes (5) and through the material to be composted upwardly and through the exit duct (10) out from the container, while the material to be composted moves, supported by the transverse tubes, in controlled manner downward as the combustion of the material progresses.

2. Compost maker according to claim 1, characterized in that the connecting tube (8) is a substantially vertically directed duct connecting, with each other, the tubes (5) lying in different planes.

3. Compost maker according to claim 2, characterized in that the transverse tubes (5) are oval in their cross section, with a placement such that they are broader in horizontal direction and narrower in vertical direction.

4. Compost maker according to claim 2, characterized in that the transverse tubes (5) are curved and at lower elevation at their ends than in the center.

5. Compost maker according to claim 2, characterized in that the transverse tubes (5) rest with their ends on an annular support which is carried by an inner shell of the container.

6. Compost maker according to claim 1, characterized in that the air intake aperture (7) comprises an adjustable valve.

7. Compost maker according to claim 6, characterized in that the exit duct (10) comprises an adjustable valve.

8. Compost maker according to claim 1, characterized in that the exit duct (10) comprises an adjustable valve.

9. Compost maker according to claim 1, characterized in that the transverse tubes (5) are oval in their cross section, with a placement such that they are broader in horizontal direction and narrower in vertical direction.

10. Compost maker according to claim 9, characterized in that the transverse tubes (5) are curved and at lower elevation at their ends than in the center.

11. Compost maker according to claim 1, characterized in that the transverse tubes (5) are curved and at lower elevation at their ends than in the center.

12. Compost maker according to claim 1, characterized in that the transverse tubes (5) rest with their ends on an annular support which is carried by an inner shell of the container.

13. Compost maker according to claim 12, characterized in that the annular support and the transverse tubes together constitute air ducts through which the air can flow into the material to be composted.

14. Compost maker according to claim 12, characterized in that the inner shell of the container comprises bosses or equivalent projections on which the annular support or the transverse tubes rest.

15. Compost maker according to claim 13, characterized in that the inner shell of the container comprises bosses or equivalent projections on which the annular support or the transverse tubes rest.

* * * * *